Jan. 29, 1952 H. GOLDBERG 2,583,832
CLAMPING CIRCUITS
Filed Feb. 28, 1947
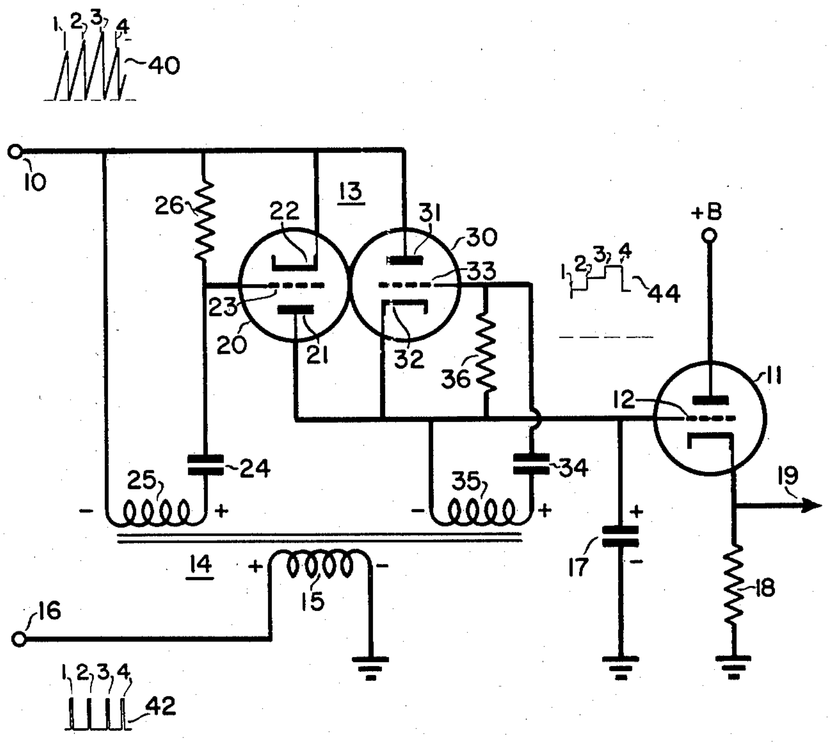
Inventor
HAROLD GOLDBERG
By Robert T. Killman
Attorney Patented Jan. 29, 1952 2,583,832

UNITED STATES PATENT OFFICE 2,583,832

CLAMPING CIRCUITS

Harold Goldberg, Towson, Md., assignor to Bendix Aviation Corporation, Towson, Md., a corporation of Delaware Application February 28, 1947, Serial No. 731,511

3 Claims. (Cl. 250—27)

This invention relates to clamping circuits, more particularly to circuits whereby a resultant voltage is established for each successive interval of time at a level identified with that of a control voltage at the moment initiating each said interval of time, during which moment the resultant and the control voltages are connected through a bi-directional electronic switch.

Circuits which have in the past performed a similar function did so by coupling the switch-actuating pulse input directly to the grids of the vacuum tubes comprising the switch. Such direct coupling requires that the pulse attain a value beyond that of the greatest voltage to be clamped. Likewise, the switch-actuating pulse must fall to a level sufficiently low to cut off the switch until the time of the next pulse. Especially when it is desired to clamp to different voltage levels does the proper operation of such an electronic switch become unsatisfactory. When the switch-actuating pulse is maintained at sufficient amplitude to exceed the maximum level of the clamping voltage, it becomes excessive for other levels, and, due to the direct coupling, the pulse appears across the clamping capacitor to prevent the attainment of proper operating conditions.

It is to be observed that transformer isolation of the control pulse voltage level from that of the reference and clamped voltage level is advantageous in that very little demand is made upon the control pulse circuits. It is possible thus to maintain the control pulse input at a uniform level, regardless of the conditions of the reference voltage; consequently the reference and clamped voltage can readily be operated at a variety of levels or at either polarity. The use of separate secondary windings and individual grid circuits in conjunction with the electronic switch further decreases the demand upon the pulse input in that discharge through grid resistors after each pulse provides cut-off bias for each of the triodes of the switch.

It is an object of this invention to provide a circuit for periodically clamping a resultant voltage to the level of a reference voltage whereby the amplitude of the required actuating pulses may be relatively small.

Another object of this invention is to provide a circuit for periodically clamping a resultant voltage to the level of a reference voltage which circuit efficiently functions regardless of the polarity, amplitude, or successive amplitudes of the reference voltage.

A further object of this invention is to provide a circuit for periodically clamping a resultant voltage to the level of a reference voltage such that the effect of the actuating pulse upon the voltage clamping capacitor is reduced to a minimum.

Other objects and advantages of the invention will become apparent from a consideration of the following specification when taken in conjunction with the accompanying drawing, in which:

The single figure is a schematic diagram of a circuit embodying the invention.

In the drawing a reference voltage of waveform illustrated by the curve 40, is applied to an input 10 and a resultant voltage, as represented by the curve 44, appears at the grid 12 of a vacuum tube 11. Connecting the input 10 and the grid 12 is an electronic switch 13 which comprises two triodes 20, 30 with anode 31 and cathode 22 connected to the input 10 and anode 21 and cathode 32 connected to grid 12. The two grids 23, 33 of the electronic switch 13 are coupled by capacitors 24, 34 respectively to one side of each of the two secondary windings 25, 35 respectively, of a transformer 14. The primary winding 15 of the transformer 14 is connected to an input terminal 16 at which point control pulses as represented by the curve 42, are introduced. The other side of the primary winding 15 is connected to ground.

The sides of the secondary windings 25, 35 opposite the capacitors 24, 34 respectively are connected to the cathodes 22, 32 respectively. A resistor 26 is connected between the grid 23 and the cathode 22. Likewise, a resistor 36 is connected between the grid 33 and the cathode 32. A capacitor 17 is connected between the grid 12 of the vacuum tube 11 and ground. The anode of the said vacuum tube is connected to a +B voltage source and the cathode of the said vacuum tube is connected to a resistor 18 which is then terminated at ground and —B. The output terminal 19 is connected to a point common to the cathode of the tube 11 and the resistor 18.

The curves 40 and 42 are representative of the voltage inputs to which the invention lends itself to provide a step voltage output as shown in curve 44.

In operation a periodically variable reference voltage such as the curve 40 depicts is applied to the input 10 and thence to the cathode 22 and plate 31 of the electronic switch 13. The points of time indicated 1, 2, 3, 4 in curves 40, 42, and 44 represent like time abscissae. At the time when the reference voltage has nearly reached its maximum periodic increase as in curve 40 a synchronized control pulse of very short time duration as represented at point 1 of curve 42 is fed through input 16 and thence to the primary winding 15 of the transformer 14, and similar pulse is induced in windings 25, 35 and fed through the capacitors 24, 34 respectively to the control grids 23, 33, of the electronic switch 13 whereby the potential on the said grids rises well above cut-off level. With the said grids above cut-off potential the path between the input terminal 10 and the capacitor 17 is completed permitting current flow in either direction for the duration of the pulse. At such time any difference of potential between the input 10 and the grid 12 together with the ungrounded side of capacitor 17 will be cancelled and the potential of the said capacitor will become that of the reference voltage at the input terminal 10.

At the completion of the pulse 1 in the curve 42 the potentials of the grids 23, 33 are likewise decreased and charges on the capacitors 24, 34 are discharged respectively through resistors 26, 36. This action drives each grid well below cut-off potential, thus isolating the reference voltage from the clamping capacitor 17. Since the said capacitor has no path through which to discharge, the potential of the ungrounded side and that of grid 12 is maintained constant until a second pulse again unblocks the electronic switch.

When the electronic switch is unblocked the grid 12 and the ungrounded side of capacitor 17 again adopt the existing potential of the reference voltage as represented by the index 2 of curve 40. If the potential at the grid 12 is less than the reference voltage during the short time when said switch is unblocked, the triode 30 will conduct; if the opposite condition exists, then triode 20 will conduct.

Vacuum tube 11 in conjunction with resistor 18 comprises a cathode follower, the anode-cathode path of which acts as a variable resistor which depends upon the potential upon the grid 12. Since both are in series between +B and −B potential, the potential at output 19 which is connected between said tube and resistor will vary proportionally as the grid potential varies.

What is claimed is:

1. A bi-directional electronic switch for intermittently connecting a source of electrical energy to an electrical storage device, said switch comprising a pair of vacuum tubes each having at least an anode, a cathode, and a control electrode, the anode of the first of said tubes being connected directly to the cathode of the second of said tubes, and the cathode of the first of said tubes being directly connected to the anode of the second of said tubes, said source being connected to one of said anodes and said storage device to the other, a plurality of energy storage devices, and an isolation transformer having a plurality of windings; the control electrodes of each of said tubes being connected through one of said energy storage devices to separate and similar windings of the said isolation transformer, the said windings in each case comprising a return circuit from the respective control electrodes to the respective cathodes, and a pair of resistors, one connected between each control electrode and its related cathode, and a source of control signals coupled equally to each of the said transformer windings.

2. A bi-directional electronic switch for intermittently connecting a source of electrical energy to an electrical storage device, said switch comprising a pair of vacuum tubes each having at least an anode, a cathode, and a control electrode, the anode of the first of said tubes being connected directly to the cathode of the second of said tubes, and the cathode of the first of said tubes being directly connected to the anode of the second of said tubes, said source being connected to one of said anodes and said storage device to the other, a source of control signals for said switch, a transformer having a pair of secondary windings, means connecting each of said windings between the control electrode and the cathode of a respective one of said tubes, grid-leak biasing means between the control electrode and cathode of each of said tubes, and means coupling said source of control signals equally to each of said secondary transformer windings.

3. A circuit for deriving the envelope of a periodically varying voltage comprising a source of said voltage, an energy storage device, a pair of vacuum tubes each having at least an anode, a cathode and a control electrode, the anode of the first of said tubes being connected directly to the cathode of the second of said tubes and being connected in series with said energy storage device, the cathode of the first of said tubes being connected directly to the anode of the second of said tubes and being connected to said source, a resistor connecting the grid of each of said tubes to the cathode thereof, a source of control signals, said signals comprising a train of pulses of such periodicity and phasing that one of said pulses occurs in coincidence with the peak of each excursion of said varying voltage having a selected polarity, a transformer having a pair of secondary windings, each of said secondary windings being connected between the control electrode and the cathode of a respective one of said tubes, a condenser connected between each of said secondary windings and the control electrode to which said winding is connected, and means impressing said control signals on the primary of said transformer.

HAROLD GOLDBERG.

REFERENCES CITED

The following references are of record in the file of this patent:

UNITED STATES PATENTS

| Number | Name | Date |
|---|---|---|
| 2,335,265 | Dodington | Nov. 30, 1943 |
| 2,392,632 | Berry | Jan. 8, 1946 |
| 2,436,890 | Higinbotham | Mar. 2, 1948 |